J. M. STUKES.
BOLL WEEVIL CATCHER.
APPLICATION FILED OCT. 21, 1919.
1,334,973.
Patented Mar. 30, 1920.
2 SHEETS—SHEET 2.
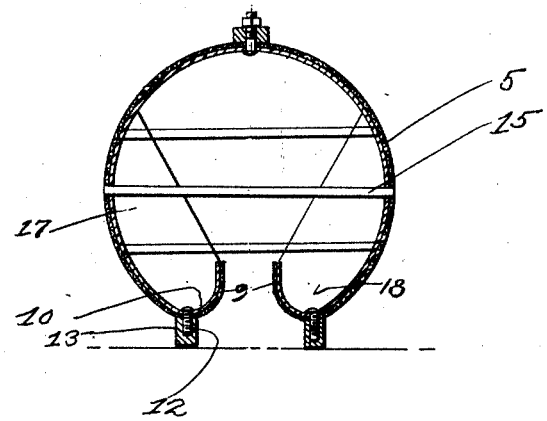
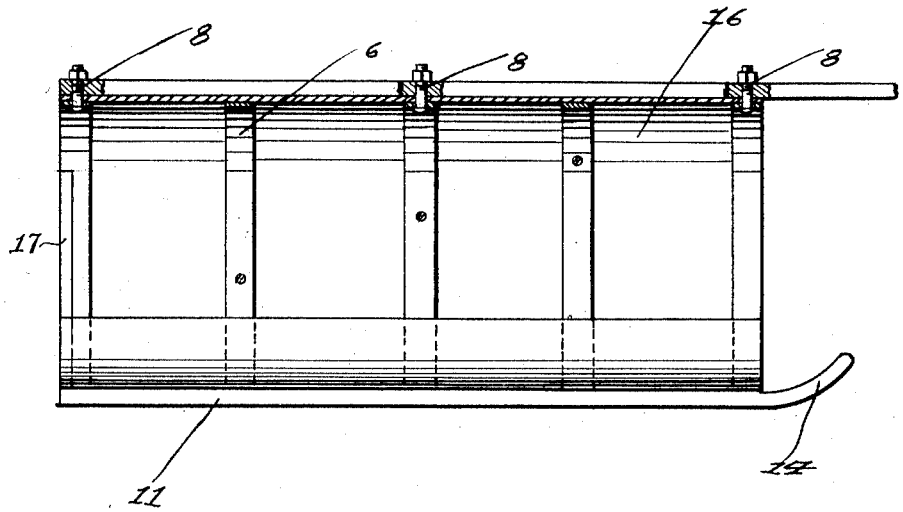
Witness
Inventor
John Marion Stukes.
Attorneys

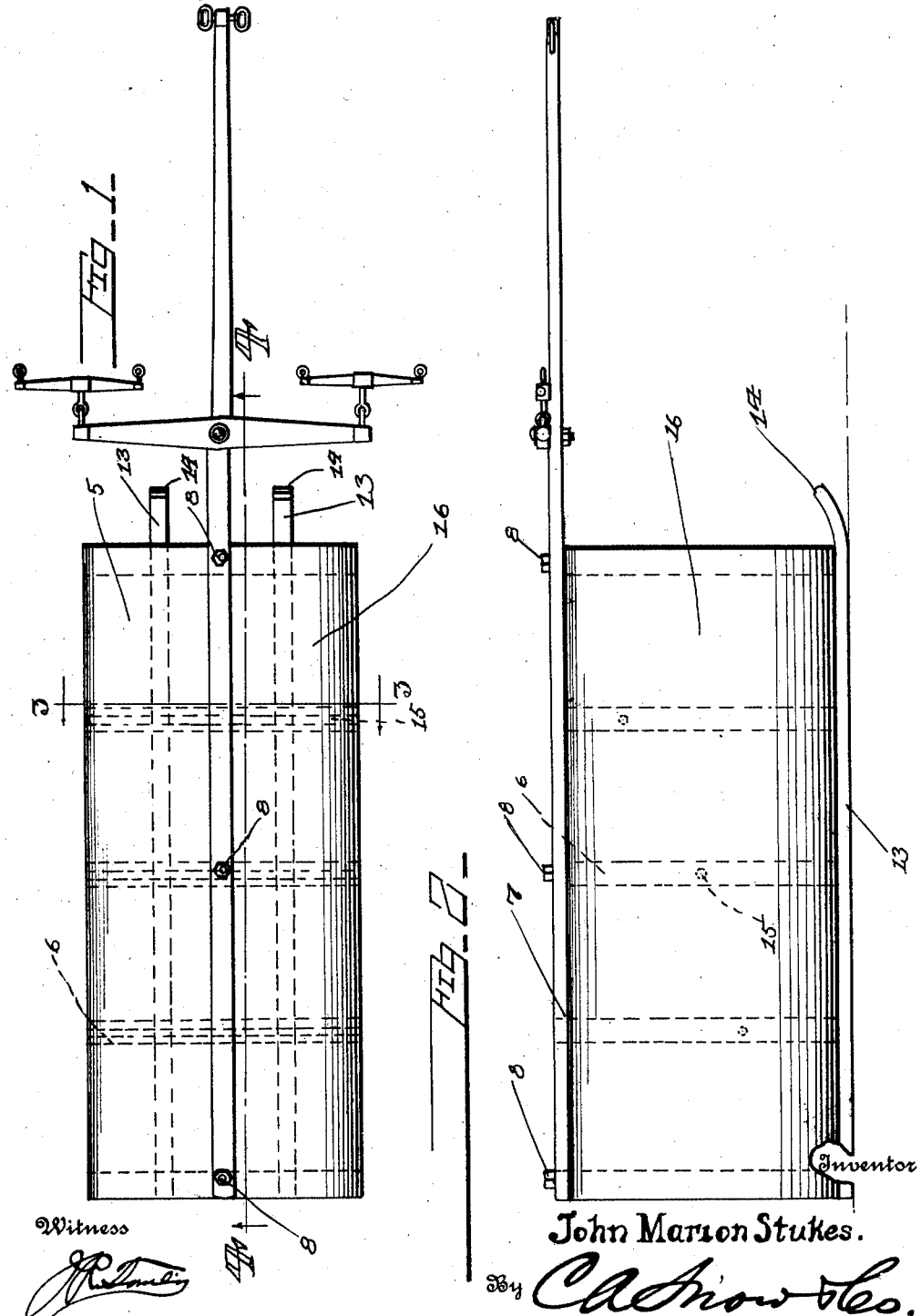

UNITED STATES PATENT OFFICE.

JOHN MARION STUKES, OF HEARNE, TEXAS.

BOLL-WEEVIL CATCHER.

1,334,973.  Specification of Letters Patent.  Patented Mar. 30, 1920.

Application filed October 21, 1919. Serial No. 332,135.

*To all whom it may concern:*

Be it known that I, JOHN M. STUKES, a citizen of the United States, residing at Hearne, in the county of Robertson and State of Texas, have invented a new and useful Boll-Weevil Catcher, of which the following is a specification.

This invention relates to new and useful improvements in devices for exterminating insects, such as boll weevils, potato bugs, or other insects infesting young and growing plants.

The primary object of the invention is to provide a device of this character having means for dislodging the insects from the plants, the means operating in conjunction with receptacles employed for receiving the insects, after the same have been dislodged, so that they may be collected and destroyed.

A further object of the invention is to provide a device for collecting the insects, the device being comparatively light and supported on skids, thus obviating the necessity of employing wheels for supporting the device, the wheels being found objectionable when employed in fields.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a plan view of an insect catching device, constructed in accordance with the present invention.

Fig. 2 illustrates a side elevational view of the same.

Fig. 3 illustrates a transverse sectional view taken on line 3—3 of Fig. 1, and

Fig. 4 illustrates a longitudinal sectional view taken on line 4—4 of Fig. 1.

Referring to the drawings in detail, the device is shown as including the body 5, comprising the curved ribs 6, which are formed of any suitable material, and disposed in spaced relation with each other, the same having connection with the relatively long bar 7, through the medium of the bolts 8, passing through the respective ribs, and the bar 7.

These curved ribs 6, have their ends disposed in spaced relation with each other, as at 9, the portions adjacent the ends being curved as at 10, so that the extreme ends 9 of the ribs, extend upwardly, terminating at points in close proximity with the ground surface, over which the device is operated.

Each of the ribs 6, has connection with the skids 11, at the curved portion 10 thereof, the bolts 12, extend through the respective ribs 6, the lower, or threaded extremities thereof being positioned in the skids 11, as shown at 13.

The forward extremity of each of the skids 11, is shown as curved upwardly as at 14, so that the device may be readily and easily moved over the ground surface, the curved portions 14 of the skids 11, being formed to permit the device to ride over lumps or clods usually prevalent in fields wherein plants are growing.

It will thus be seen that the skids 11 provide means for securing the upwardly extending ends 9 of the ribs 6 in proper spaced relation with each other, at all times, so that the same will clear the stalks of the plants, over which the device is operating, the leaves of the plants lying directly within the device, to be engaged by the transversely extending bars 15, to be hereinafter more fully described.

These transversely extending bars 15, have connection with certain ribs of the body, and as shown, the bars are arranged in stepped relation with each other, the bars 15 adjacent the forward end of the device being disposed in greater spaced relation with the ground surface, than the bars 15, at the rear of the device, so that the forward bars 15, engage the plants near the tops thereof, while the bars 15, at the rear of the machine contacts with the plant adjacent the ground surface, whereby a device is provided for operating on substantially the entire plants being treated.

The body of the device also includes a covering element 16, which may be formed of canvas, wire screen, or other suitable material, and as shown, extends entirely around the ribs 6, of the body, between the ribs and the skids 11, and under the relatively long bar 7, so that the bolts, employed for securing the ribs to the skids 11, and relatively long bar 7, provide means for securing the covering element 16 to the body.

The closures 17, close the rear ends of the curved portions 10, of the body, the same extending upwardly, and terminating at points adjacent the upper portion of the body, so that the insects, caught in the curved portions 10 of the body, may not crawl out of the body, at the ends thereof.

From the foregoing it is obvious that when the covering element 16, has been properly applied to the ribs 6, the curved portions of the ribs, shown at 10, cause the covering to take a curved formation, at this point, to the end that parallel troughs 18, are provided, which troughs act as receiving receptacles, for receiving the insects, which are dislodged from the plants, when the machine is passing thereover.

The forward portion of the relatively long bar 7, provides means for hitching draft animals to the device, so that the animals walk between rows of plants, when the device is properly positioned at one end of the row of plants under operation.

While I have shown and described the device as relatively large, and one which is operated by horse-power, it is to be understood that the same may be reduced in size, to permit the device to be operated by hand.

Having thus described the invention, what is claimed is:—

In an insect catching device, a body including spaced curved ribs, each of said ribs having its lower ends curved inwardly and upwardly, skids having connection with the ribs for securing the same in spaced relation with each other, means extending through the ribs adjacent the curved ends for securing the ribs to the skids, a covering element embracing the ribs, and providing spaced longitudinal troughs, closures formed at one end of the respective troughs, means connecting the ribs for contacting with plants over which the machine is operating and a relatively long bar connecting the upper portions of the ribs.

In testimony that I claim the foregoing as my own, I have hereto affixed my signature in the presence of two witnesses.

JOHN MARION STUKES.

Witnesses:
J. S. KINGSLEY,
WM. RABE.